(12) United States Patent
Ryabko et al.

(10) Patent No.: US 11,979,850 B2
(45) Date of Patent: *May 7, 2024

(54) APPARATUS AND METHOD FOR DETERMINING A PREFERRED LOCATION FOR INSTALLATION OF A RADIO TRANSCEIVER

(71) Applicant: Cambium Networks Ltd, Ashburton (GB)

(72) Inventors: Michael Ryabko, Chicago, IL (US); Matthew Rawcliffe, Plymouth (GB); Andrew Haywood, Stoke-on-Trent (GB); Benjamin Poche, Wichita Falls, TX (US); Daniel Canty Sullivan, Glen Ellyn, IL (US)

(73) Assignee: Cambium Networks Ltd, Ashburton (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/179,237

(22) Filed: Mar. 6, 2023

(65) Prior Publication Data

US 2023/0217407 A1 Jul. 6, 2023

Related U.S. Application Data

(63) Continuation of application No. 17/070,357, filed on Oct. 14, 2020, now Pat. No. 11,601,912.
(Continued)

(51) Int. Cl.
*H04W 64/00* (2009.01)
*H04W 4/029* (2018.01)
(Continued)

(52) U.S. Cl.
CPC ......... *H04W 64/003* (2013.01); *H04W 4/029* (2018.02); *H04W 16/18* (2013.01);
(Continued)

(58) Field of Classification Search
None
See application file for complete search history.

(56) References Cited

U.S. PATENT DOCUMENTS

| 8,755,566 B1 | 6/2014 | McLaughlin et al. |
| 2013/0321407 A1 | 12/2013 | Jenkins |

(Continued)

FOREIGN PATENT DOCUMENTS

| CN | 105761310 A | 7/2016 |
| GB | 2516513 A | 1/2015 |

OTHER PUBLICATIONS

ThanhHao-Nguyen, Trong-NguyenDuy, AnhTra-Duong, A New Algorithm for Viewshed Computation on Raster Terrain, 2018, 2nd International Conference on Recent Advances on Signal Processing, Telecommunications & Computing (SigTelCom) (Year: 2018).

(Continued)

*Primary Examiner* — German Viana Di Prisco
(74) *Attorney, Agent, or Firm* — Crowell & Moring LLP

(57) ABSTRACT

A respective preferred installation height above ground level is determined for each of a plurality of locations for a subscriber module for receiving a radio link from an access point in a wireless network, the access point having a given height above ground level and a specified location, and the subscriber module being situated within a given geographical area including the location of the access point. The method comprises accessing elevation data for the given geographical area, processing the elevation data to generate a preferred height data file representing a preferred height for a subscriber module to be wirelessly visible by the access point at each of the plurality of locations and processing the required height data file to provide output data indicating the preferred height of the subscriber module as a function of location.

20 Claims, 15 Drawing Sheets

Related U.S. Application Data

(60) Provisional application No. 62/914,975, filed on Oct. 14, 2019.

(51) Int. Cl.
　　*H04W 16/18*　　(2009.01)
　　*H04W 48/16*　　(2009.01)
　　*H04W 48/20*　　(2009.01)
　　*H04W 84/04*　　(2009.01)

(52) U.S. Cl.
　　CPC ........... *H04W 48/16* (2013.01); *H04W 48/20* (2013.01); *H04W 84/045* (2013.01)

(56) References Cited

U.S. PATENT DOCUMENTS

| | | |
|---|---|---|
| 2015/0199380 A1 | 7/2015 | Avramova |
| 2016/0285728 A1* | 9/2016 | Jhoney ................. H04L 41/069 |
| 2021/0289366 A1 | 9/2021 | Ginis |
| 2022/0110001 A1 | 4/2022 | Ginis |

OTHER PUBLICATIONS

Natalija Stojanovic, Dragan Stojanovic, Performance Improvement of Viewshed Analysis Using GPU, Telsiks 2013 (Year: 2013).

Herman Haverkort, Laura Toma, Yi Zhuang, Computing Visibility on Terrains in External Memory, ACM Journal of Experimental Algorithmics, vol. 13, Article No. 1.5, Publication date: Nov. 2008 (Year: 2008).

Ericsson et al, Elevation Angular Modeling and Impact on System Performance (7 pages).

* cited by examiner

APPARATUS AND METHOD FOR DETERMINING A PREFERRED LOCATION FOR INSTALLATION OF A RADIO TRANSCEIVER

CROSS-REFERENCE TO RELATED APPLICATIONS

This application is a continuation of U.S. application Ser. No. 17/070,357, filed on Oct. 14, 2020, issuing as U.S. Pat. No. 11,601,912 on Mar. 7, 2023, which claims the benefit of the filing date under 35 U.S.C. § 119(e) of Provisional U.S. Patent Application Ser. No. 62/914,975, filed Oct. 14, 2019, which are hereby incorporated by reference in their entireties.

TECHNICAL FIELD

The present invention relates generally to an apparatus and method for determining a preferred location for installation of a radio transceiver, and more specifically, but not exclusively, to a method and system for determining a respective preferred installation height above ground level for each of a plurality of locations for a subscriber module for receiving a radio link from an access point in a wireless network, the access point having a given height above ground level and a specified location, and to a method and system for determining preferred locations for an access point for receiving a radio link from a plurality of subscriber modules in a wireless network, the subscriber modules and the access point being situated within a given geographical area.

BACKGROUND

In modern wireless systems, such as, for example, fixed wireless access networks, there is a need to determine locations for the siting of access point to serve subscriber modules within a given area, and also to determine which locations within a given area can be served by an access point installed at a given height and location, and at what height subscriber modules should be installed.

Conventionally, a location for an access point may be chosen based on, amongst other factors, terrain height, to serve a given area, and a preferred installation height for a subscriber module, which may, for example, be fixed to a pole attached to a building, may be chosen on the basis of received signal strength of a trial radio transmission from an access point.

DETAILED DESCRIPTION

Aspects of the invention are provided by the features of the claims.

Further features and advantages of the invention will be apparent from the following description of preferred embodiments of the invention, which are given by way of example only.

Embodiments of the invention will now be described in the context of deployment of a fixed wireless access network comprising a plurality of subscriber modules, typically to be mounted on customer premises at a determined height, in communication with one or more wireless access points.

However, it will be understood that this is by way of example only and that other embodiments may relate to other wireless systems, including fixed and mobile wireless systems operating in a variety of signal transmission bands. In embodiments of the invention, operating frequencies of, for example, approximately 900 MHz, 2 GHz and 3 GHz are envisaged, but the embodiments of the invention are not restricted to these frequencies, and in particular embodiments of the invention are suitable for use at higher operating frequencies of up to 60 GHz or even higher.

Figure 1:
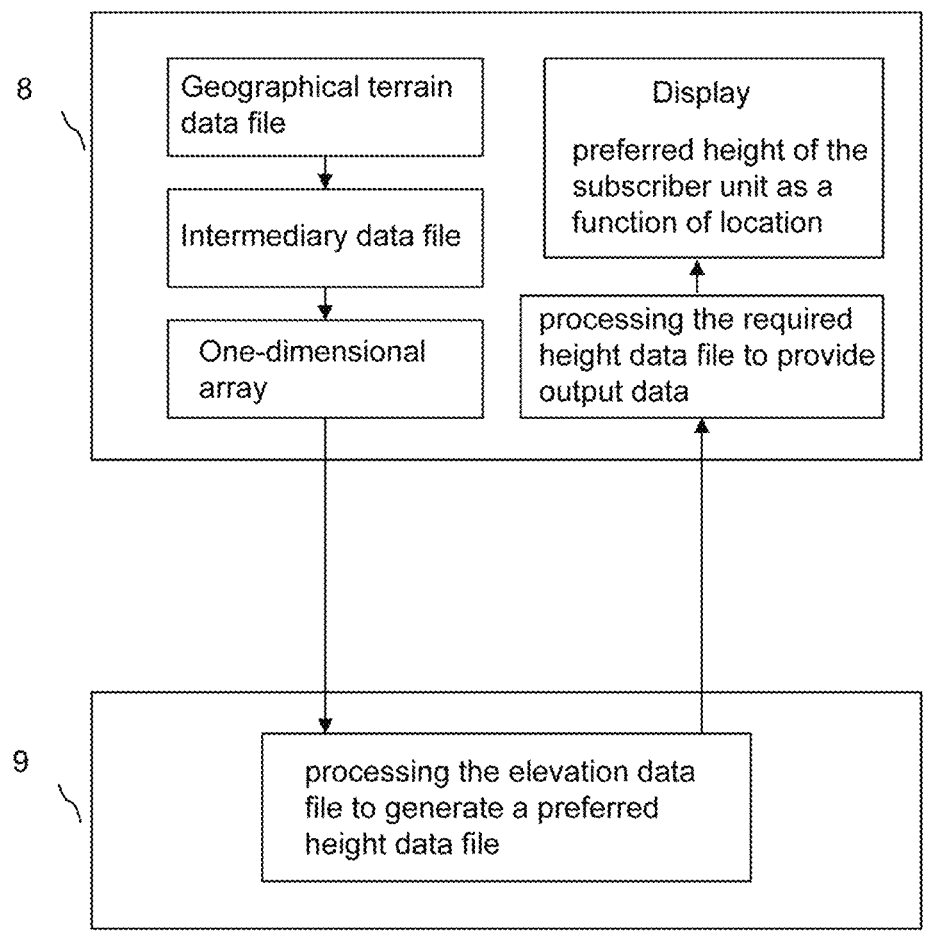
FIG. 1 illustrates a system comprising two computing devices for determining a respective preferred installation height above ground level for each of a plurality of locations for a subscriber module.
Figure 2:
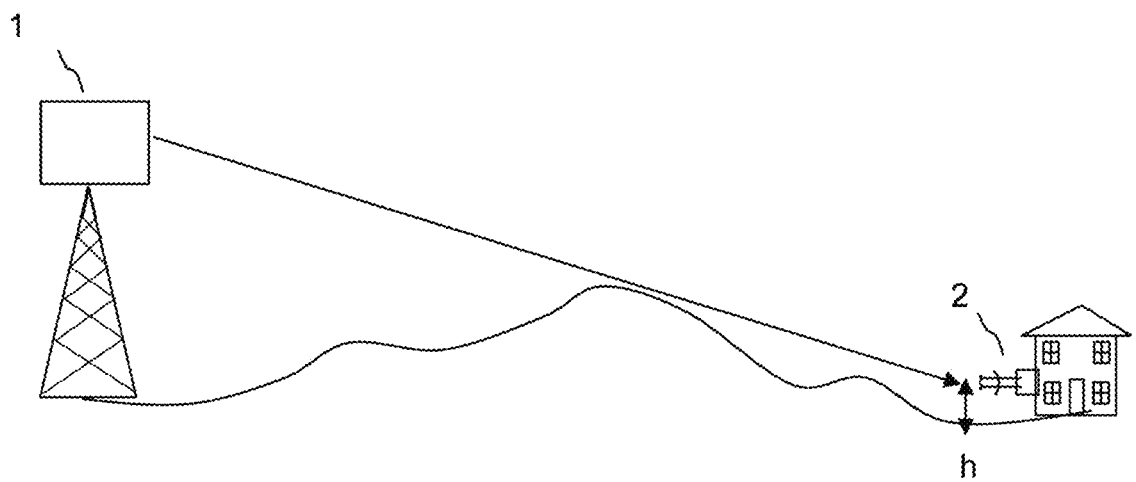
FIG. 2 shows a schematic representation of an access point and a subscriber module showing a height of the subscriber module to allow a direct ray.
Figure 3:
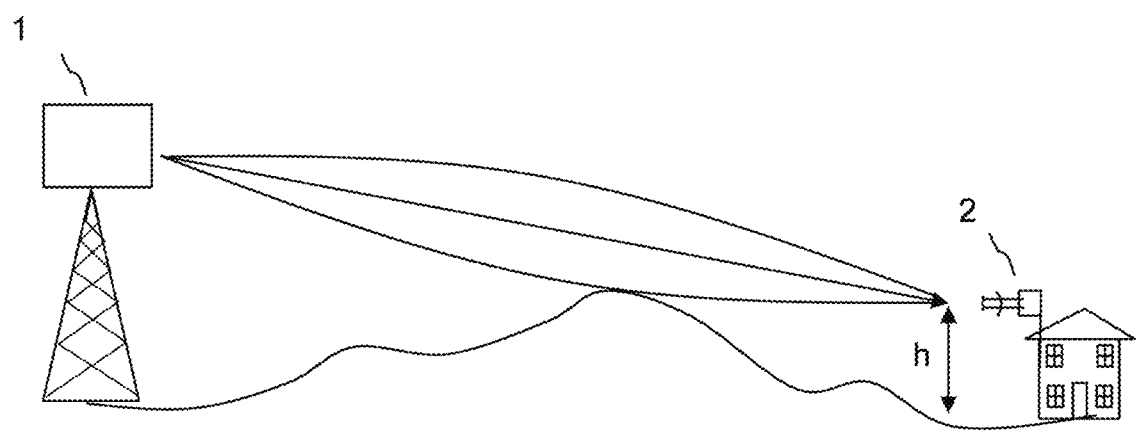
FIG. 3 shows a schematic representation of an access point and a subscriber module showing a height of the subscriber module to allow wireless visibility without intrusion into a Fresnel zone.

FIG. 1 illustrates an example of a system comprising two computing devices for determining a respective preferred installation height above ground level for each of a plurality of locations for a subscriber module. The two computing devices may be a CPU 8 (Central Processing Unit), which may be referred to as the host, and a GPU 9 (Graphics Processing Unit). The Graphics Processing Unit may be a high performance computing unit, typically designed to allow parallel processing of image data. Alternatively, data may be transferred from the CPU through a data connection to cloud processing for the GPU function. In other embodiments, the system may comprise a single computing device. The system may comprise memory holding computer executable instructions to cause one or more processors to execute the claimed methods. In one example, the system executes a method of determining a respective preferred installation height above ground level for each of a plurality of locations for a subscriber module 2 for receiving a radio link from an access point 1 in a wireless network. As illustrated in FIGS. 2 and 3, the access point has a given height above ground level and a specified location, and the subscriber module is situated within a given geographical area including the location of the access point. The executed method comprises accessing elevation data which may be in the form of an elevation data file for the given geographical area, and processing the elevation data file to generate a preferred height data file representing a preferred height for a subscriber module to be wirelessly visible by the access point at each of the plurality of locations. The required height data file is processed to provide output data indicating the preferred height of the subscriber module as a function of location.

Figure 4:
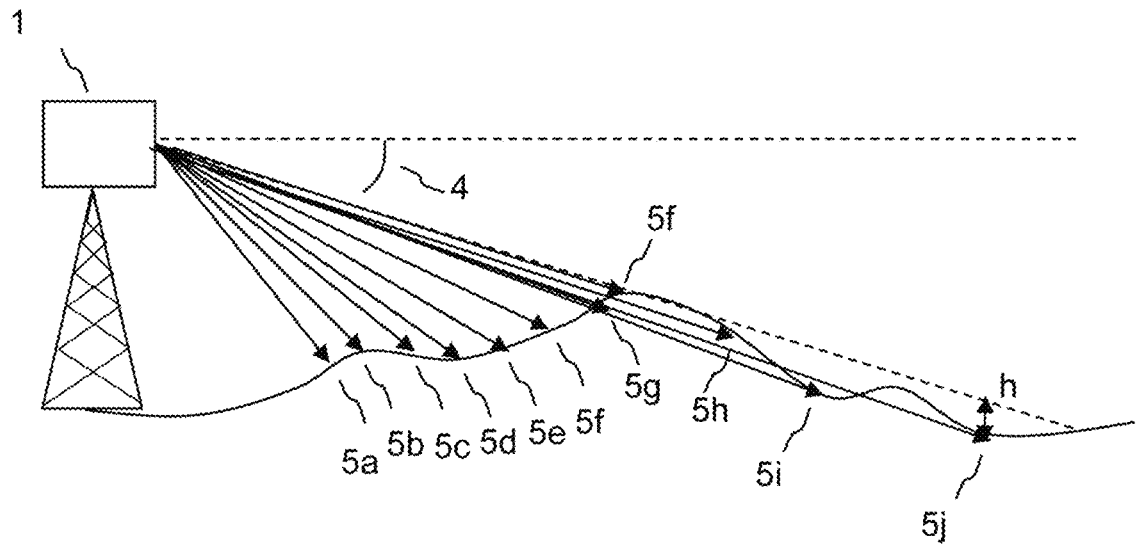
FIG. 4 illustrates an iterative process of calculating an angle in elevation for a ray between the subscriber module and a plurality of successive locations on each respective path away from the subscriber module.

As illustrated in FIG. 4, processing the elevation data file to generate a preferred height data file may be by an iterative process comprising calculating, for each of a plurality of paths extending radially away from the access point to a respective point on a boundary of an area containing the access point, an angle of inclination from the horizontal for a ray between the access point and a plurality of successive locations on each respective path away from the access point. The angle of inclination is numerically equal to declination angle 4 shown in FIG. 4. For each successive location 5a . . . 5j on the respective path, the current angle of inclination is compared to a running minimum angle of inclination for the path, and dependent on the current angle of inclination being greater than the running minimum angle of inclination for the path, calculating the preferred height of the subscriber module as at least the height that would result in wireless visibility between the access point and the subscriber module.

Figure 6:
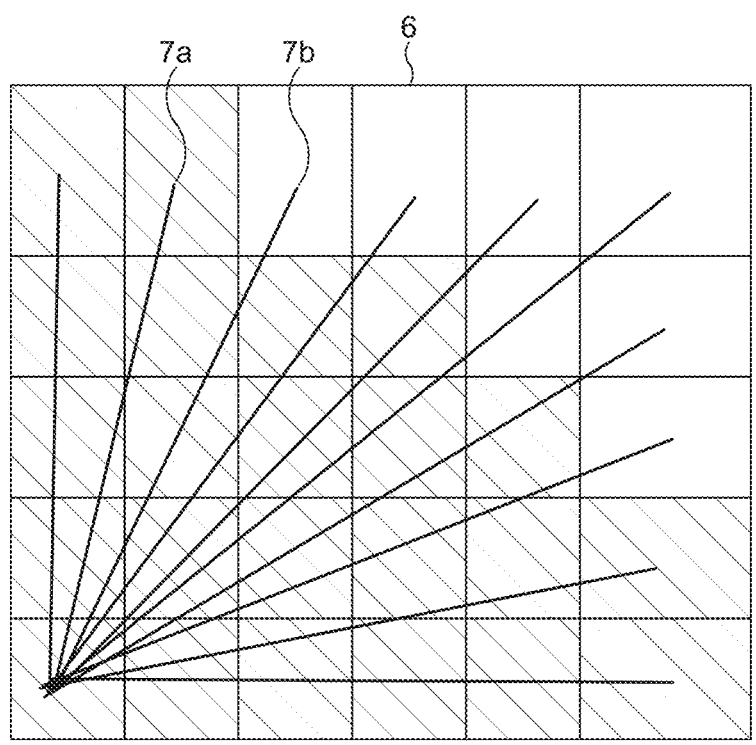
FIG. 6 illustrates a plurality of paths extending radially away from the subscriber module to a respective point on a boundary of an area containing the subscriber module.

FIG. 6 shows the plurality of paths 7a, 7b extending radially away from the access point to a respective point on a boundary 6 of an area containing the access point.

As illustrated in FIG. 4, calculating the preferred height of the subscriber module as at least the height that would result in wireless visibility between the access point and the subscriber module comprises calculating the preferred height of the subscriber module as at least the height that would result in an angle of inclination equal to the running minimum angle of inclination for the path, as shown by the broken line extending path 5f.

Figure 5:
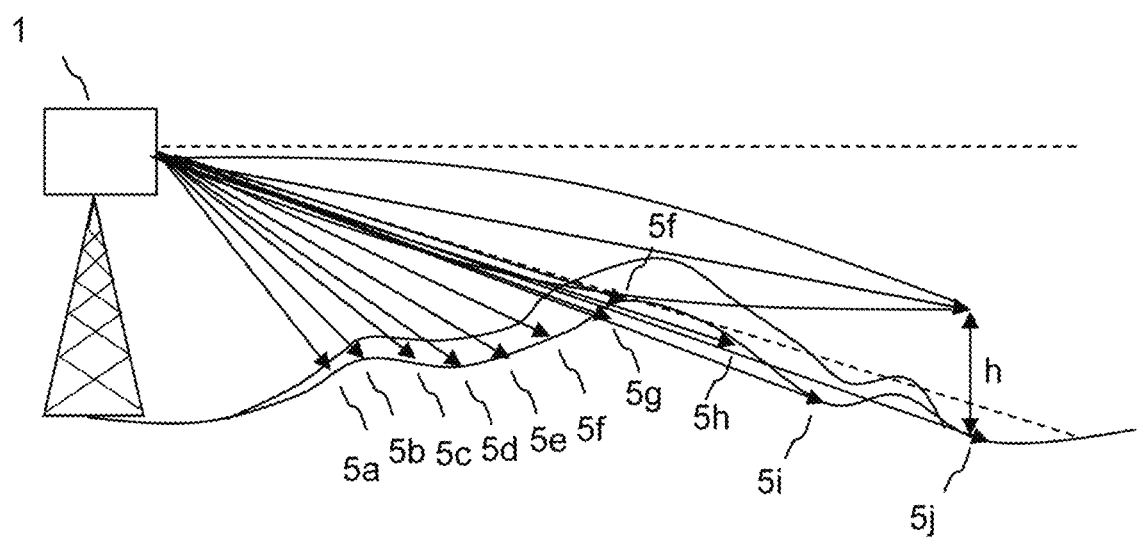
FIG. 5 illustrates a process of adding a respective height allowance for a Fresnel zone to the elevation at each of a plurality of locations between the access point and the subscriber module to determine a modified terrain height.

As illustrated in FIG. 5, calculating the preferred height of the subscriber module as at least the height that would result in wireless visibility between the access point and the subscriber module may comprise adding a respective height allowance for a Fresnel zone to the elevation at each of a plurality of locations between the access point and the subscriber module to determine a modified terrain height for each of the plurality of locations and calculating the preferred height of the subscriber module such that a line of sight between the subscriber module and the access point clears the modified terrain height for each of the plurality of locations. The Fresnel zone is a region in which obstructions could cause degradation to the radio link performance. It is well known in the art how to calculate the size of the Fresnel zone for a given frequency and separation of transmitter and receiver.

In an example, accessing the elevation data for the given geographical area may comprise providing a geographical terrain data file for the given geographical area, and processing the geographical terrain data file to create an elevation data file having elevation data for each of a plurality of raster tiles. The geographical terrain data file may comprise terrain and clutter data and may have has a GeoTIFF format. The terrain data gives the height of the underlying ground level, and the clutter gives the height of objects such as buildings and trees. Processing the geographical terrain data file to create the elevation data file may comprise processing the geographical terrain data file to create an intermediary data file having a pixelated raster tile format and having associated geographic data associated with each of a plurality of tiles. The intermediary data file may have a Virtual Raster Tile format. The intermediary data file may be processed to extract first elevation data as a one-dimensional array representing elevation data of each of the plurality of tiles representing locations within an area of control of the access point. The elevation data may be a combination of the clutter height and the terrain height. The one-dimensional array may be copied from the first computing device, typically the CPU, to the second computing device, typically the GPU, or cloud-based processing functionality. The processing of the elevation data may be performed on the second computing device, and the output data may be transferred from the second computing device to the first computing device. A representation of output data may be displayed on the first computing device, indicating the preferred height of the subscriber unit as a function of location on the first computing device.

Figure 7:
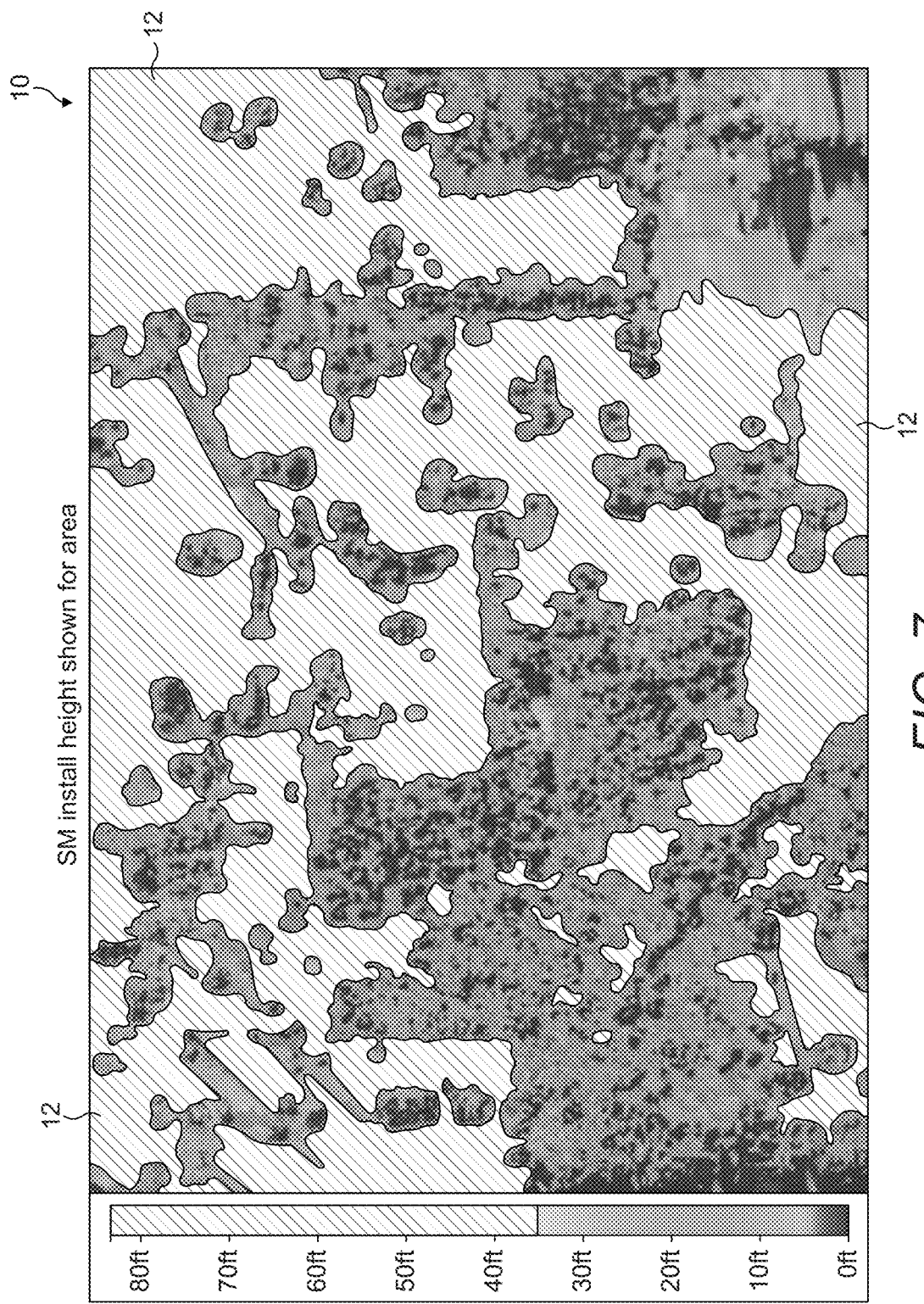
FIG. 7 shows a display in the form of a heat map showing required SM height as a function of location.

An example of a display of the output data is given in FIG. 7, in which the display is in the form of a heat map 10 showing required SM height as a function of location. This shows the subscriber module required installation height for a given area, for a given access point location. Processing the required height data file comprises receiving an input indicating a maximum subscriber height and processing the required height data file to create a data file indicating locations at which a subscriber module is wirelessly visible by the access point. This allows a user to place an access point site, and display the required minimum subscriber module height for connectivity for each pixel location of the coverage map. This allows a quick understanding of the best way to install a subscriber module on a customer property, i.e. the location and height.

Figure 8A:
FIG. 8*a* shows a display in the form of a map showing areas where a SM of height 1 foot has wireless visibility from a given access point.
Figure 8B:
FIG. 8*b* shows a display in the form of a map showing areas where a SM of height 10 feet has wireless visibility from a given access point.
Figure 9:
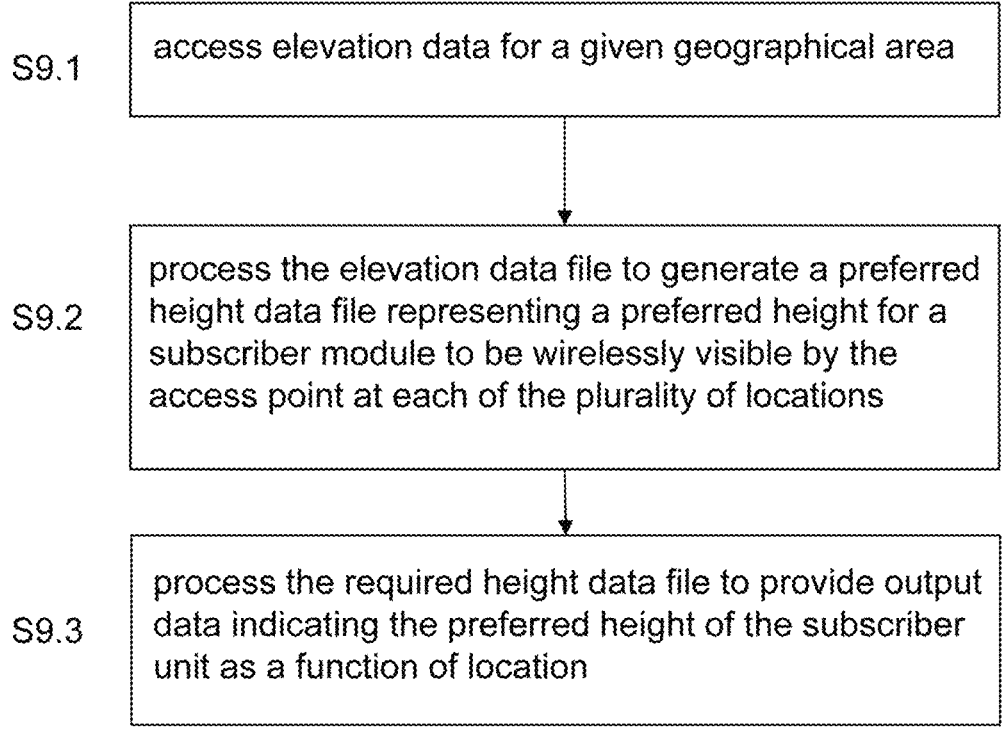
FIG. 9 is a flow diagram of a first aspect of the claimed method.
Figure 10:
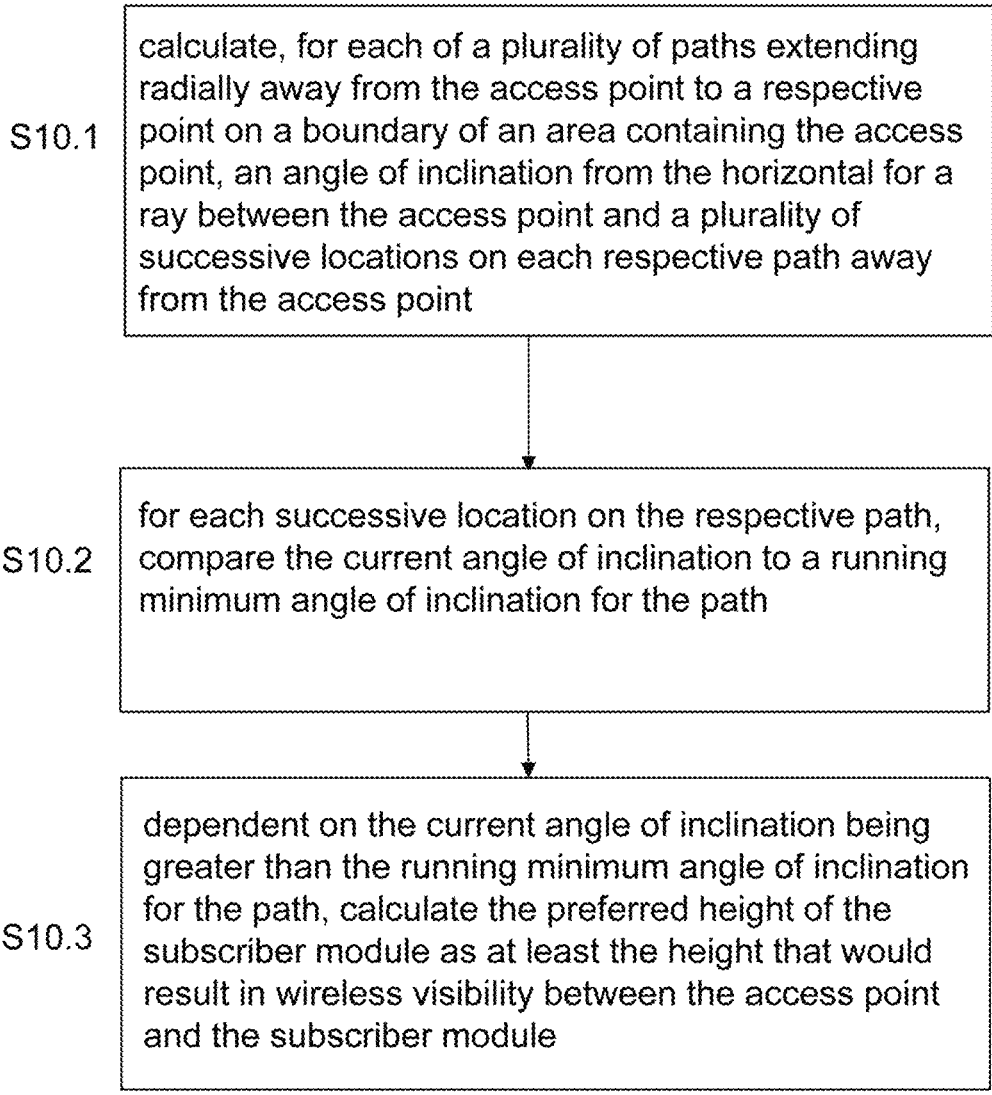
FIG. 10 is a flow diagram of a second aspect of the claimed method.
Figure 15:
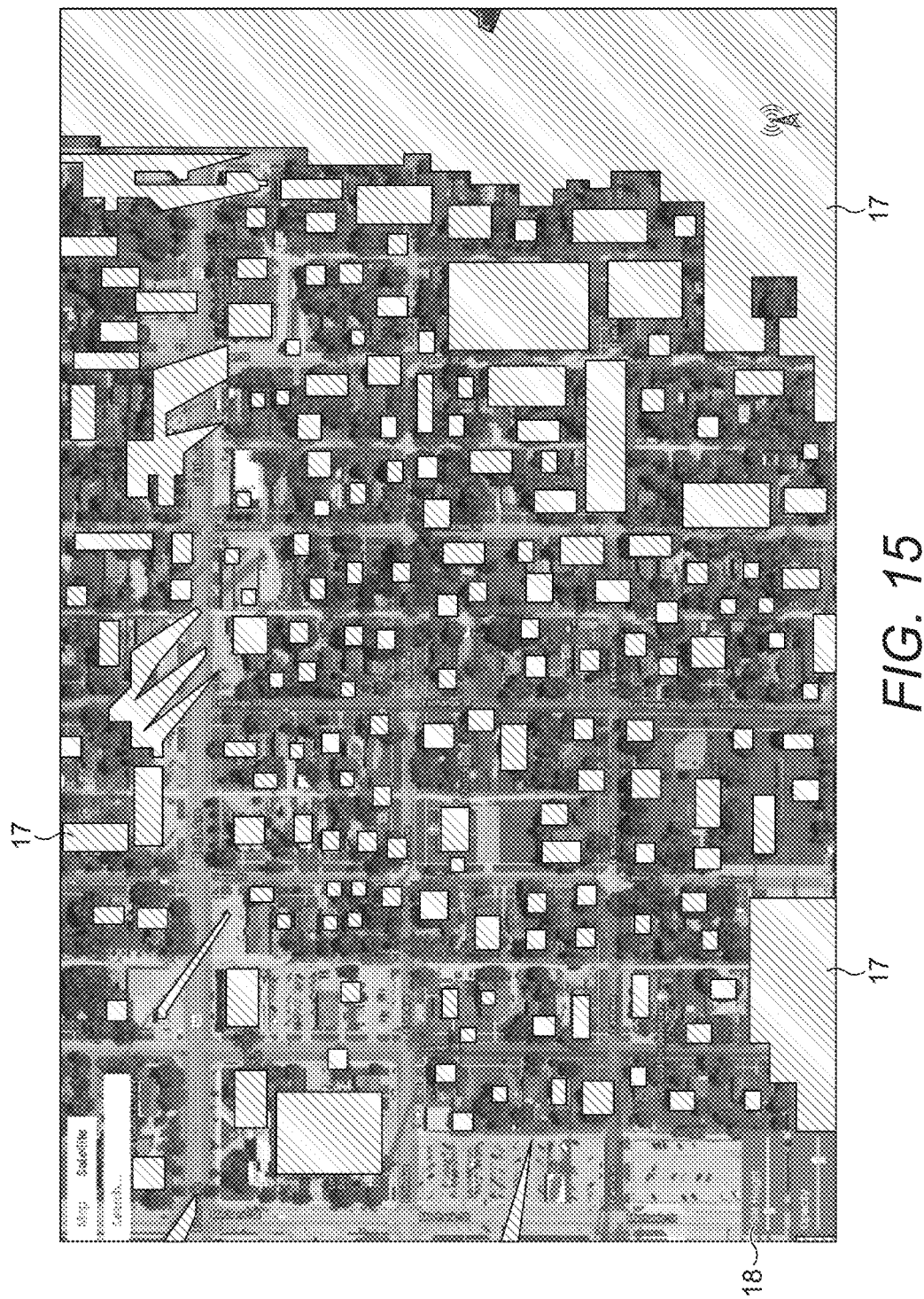
FIG. 15 is an example of a display showing areas where a SM of has wireless visibility from a given access point, the height of the SM being dynamically variable by the user by means of a slider.

FIGS. 8a and 8b show an alternative display 10 of output data in the form of a map showing areas 11a, 11b where a SM of a given height above the terrain and clutter, including buildings has wireless visibility from a given access point. A slider control, as also illustrated in FIG. 15 indicated by reference numeral 18, allows a user to input the minimum subscriber module height, and the area where a subscriber module has wireless visibility is shown on the display, as the hashed areas 11a, 11b and 17 in FIGS. 8a, 8b and 15 respectively. In this way an efficient user interface is created, allowing rapid processing of the output data file to provide a meaningful output to the user. FIG. 8a shows the display showing areas where a SM of height 1 foot above terrain and clutter has wireless visibility from a given access point, and FIG. 8b shows the larger areas resulting from a subscriber module height of 10 feet. (1 foot=0.305 m), This provides a next generation heat map, in which the height of the subscriber module can be dynamically specified using the slider control 18 as an installation aid, to find the minimum subscriber module height required for installation at a given properties displayed in the satellite-view map over which the heat map is overlaid. This provides an extremely efficient and user-friendly installation aid. The slider is moved until an area indicating wireless visibility is shown at the location of the property of interest. The indicated height on the slider then gives the required height of the subscriber module above the building. This process may be carried out by an installer or automatically under control of the CPU for a given property of interest.

Figure 11:
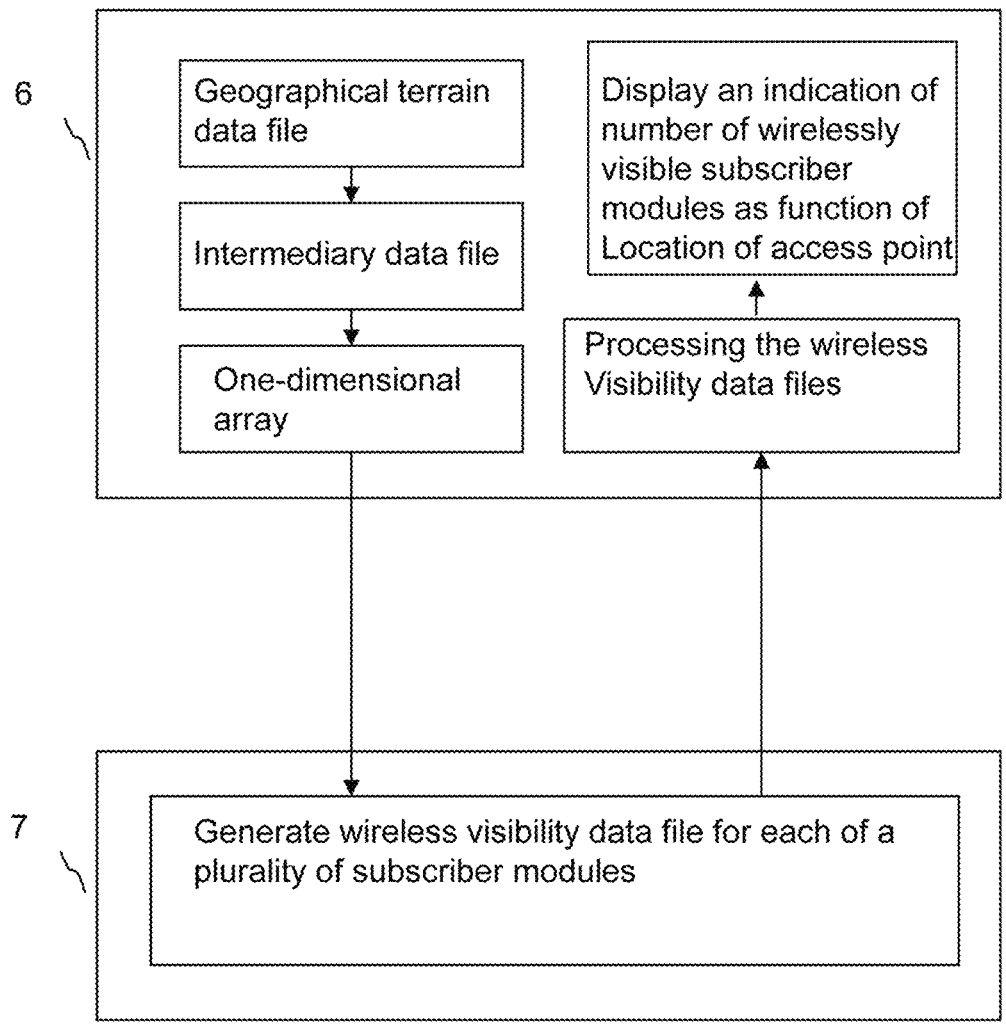
FIG. 11 illustrates a system comprising two computing devices for determining an indication of number of wirelessly visible subscriber modules as function of location of access point.
Figure 12:
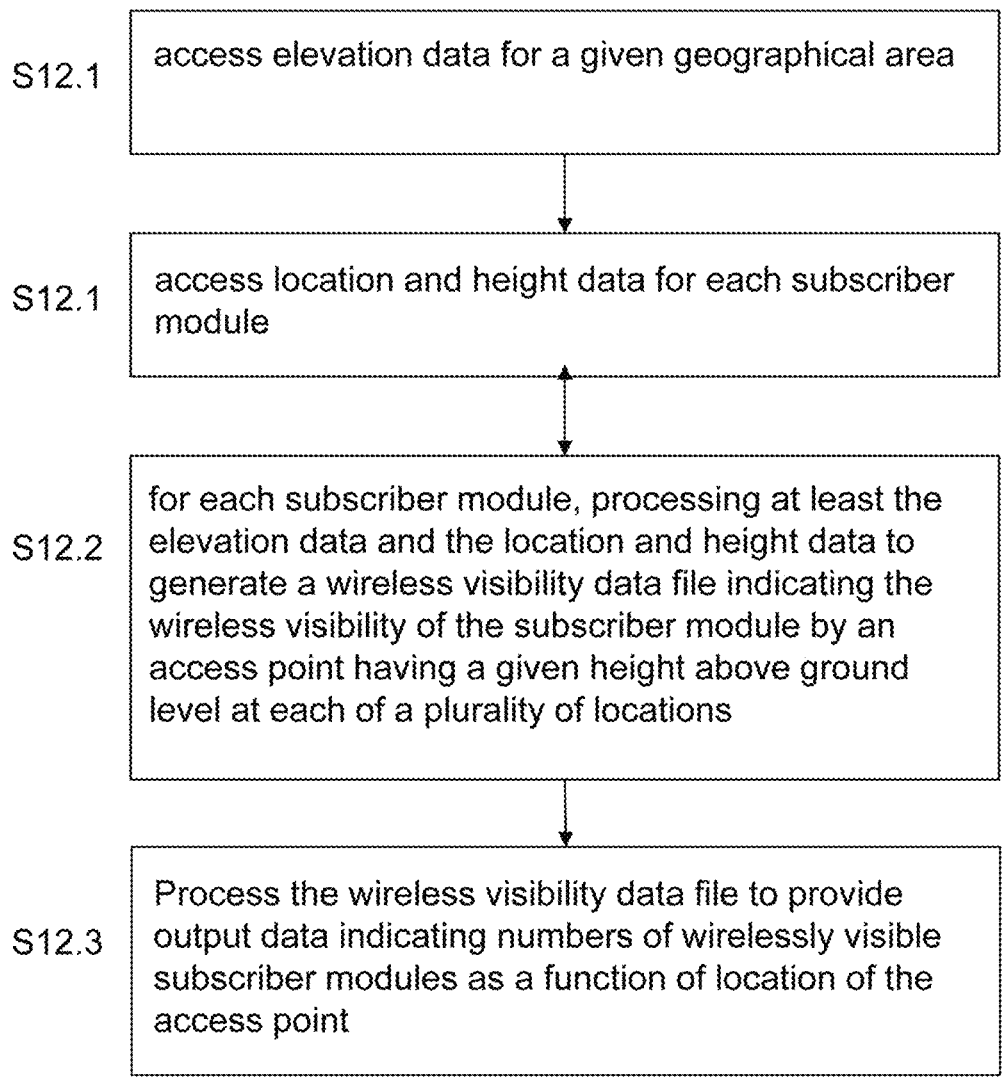
FIG. 12 is a flow diagram of a third aspect of the claimed method.
Figure 13:
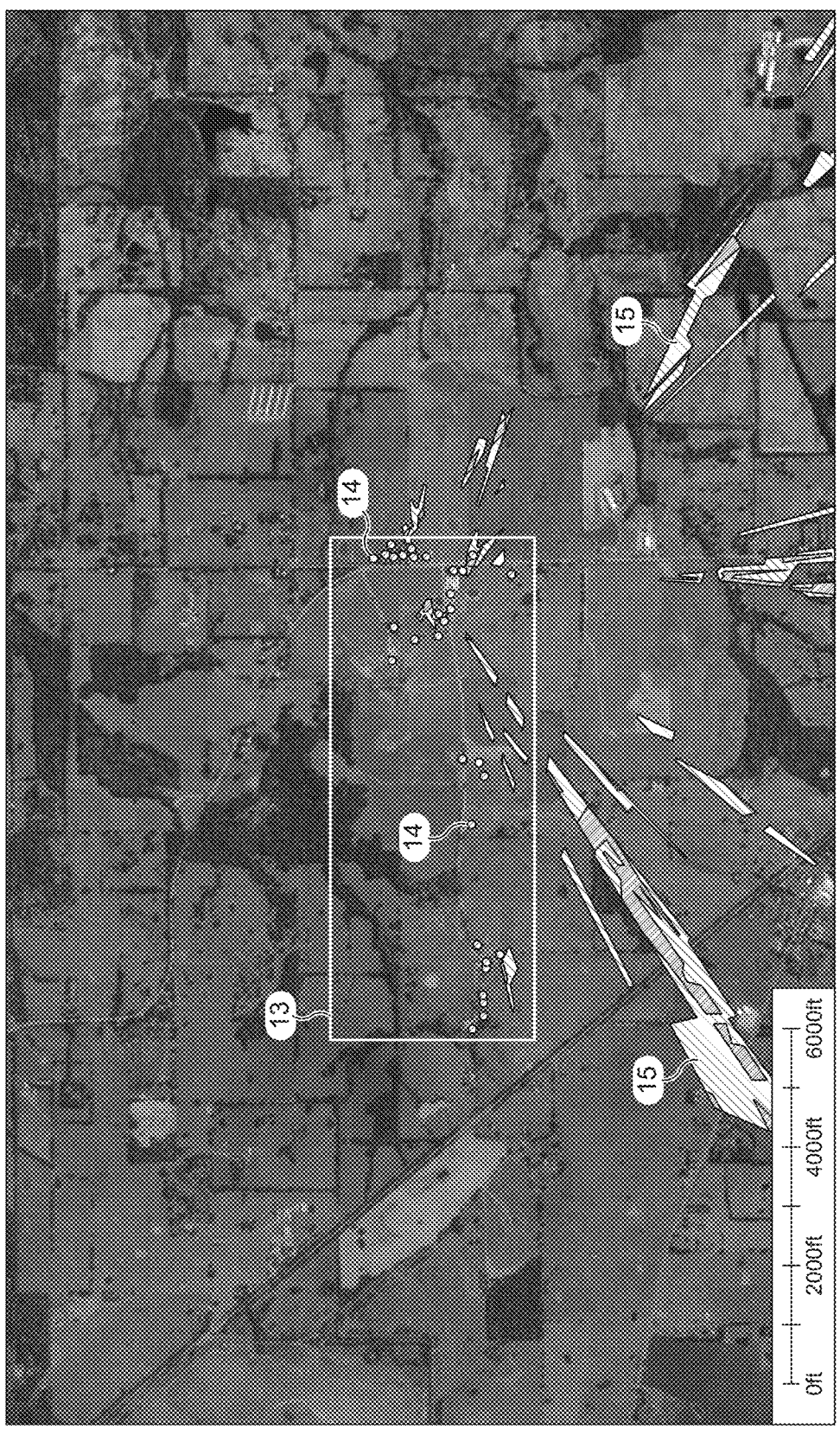
FIG. 13 is an example of a display showing a heat map of % of covered subscriber module locations as a function of access point location.
Figure 14:
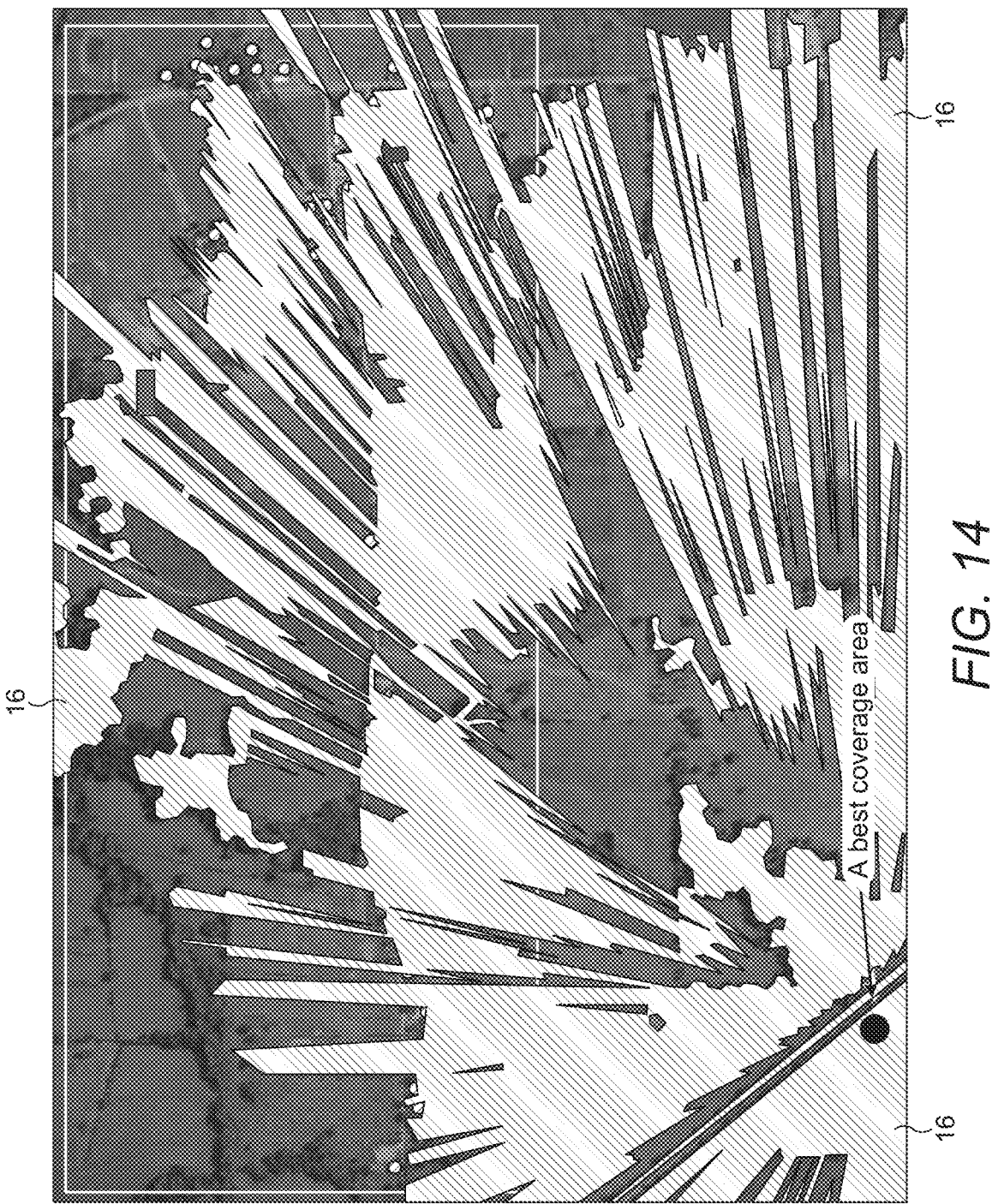
FIG. 14 is an example of a coverage map for subscriber modules of a given height for a chosen access point location.

FIG. 11 illustrates a system comprising two computing devices for determining an indication of number of wirelessly visible subscriber modules as function of location of access point. This can be used, for example for determining a preferred location for installing an access point in green filed planning, where the position of properties at which subscriber modules may be installed is known, and it is desired to find a beneficial position in which to install an access point to give coverage to as many subscriber module positions. The first computing device 6 may be a CPU and the second computing device 7 may be a GPU. The method may be as shown in the flow chart of FIG. 12. The output may be in the form of a heat map as shown in FIG. 13. The percentage of covered subscriber module locations that would be achieved by siting an access point in a given location is shown by the heatmap, typically as different colours indicating percentages. In the monochrome example of FIG. 13, the hashed areas 15 indicate areas for which an access point sited in the hashed area would give coverage to more than a given percentage, typically 80%, of buildings requiring coverage (shown by small circles) 14 within the designated area 13. This provides an efficient interface to the user for use in an efficient process of determining a beneficial position for siting an access point to give good coverage. This may be used for near-real-time greenfield site planning A site may be selected from the heat map of FIG. 13 and then the results confirmed very rapidly using the display of FIG. 14, typically within a few seconds. This provides an efficient tool for use by installation teams installing access points and subscriber modules. FIG. 14 shows an output map showing coverage of the chosen site of the access point, for subscriber modules of a given height. The white rectangle indicates the same designated area 13 as the rectangle in FIG. 13. The access point is sited for this example at the black circle indicated as giving "A best coverage area" in FIG. 14. This siting of the access point was selected from the heat map of FIG. 13, as a position that gives the required percentage coverage of the buildings requiring coverage. This display gives an efficient method of confirming the coverage of buildings, i.e. potential subscriber module sites, that results from the choice of access point site from the display of FIG. 13. The hashed areas 16 indicate the locations where a subscriber module of a given height above the terrain and clutter may be given coverage.

The system of FIG. 11 may comprise a CPU and GPU, or may comprise a CPU and a connection to cloud computing to perform functions of a GPU, or other hardware arrangement. The system of FIG. 11 may be the same system as that of FIG. 1.

The method, as typically performed by the system of FIG. 11, determines preferred locations for an access point for receiving a radio link from a plurality of subscriber modules in a wireless network, the subscriber modules and the access point being situated within a given geographical area. The method comprises accessing elevation data for the given geographical area; and accessing location and height data for each subscriber module.

For each subscriber module, at least the elevation data and the location and height data is processed to generate a wireless visibility data file indicating the wireless visibility of the subscriber module by an access point having a given height above ground level at each of a plurality of locations. The wireless visibility data file is processed to provide output data indicating numbers of wirelessly visible subscriber modules as a function of location of the access point. The output data may be as displayed in FIG. 13.

Processing the elevation data and the location data to generate a wireless visibility data file may be by an iterative process comprising calculating, for each of a plurality of paths extending radially away from the subscriber module to a respective point on a boundary of an area containing the subscriber module, an angle in elevation for a ray between the subscriber module and a plurality of successive locations on each respective path away from the subscriber module. For successive locations on the respective path, the current angle in elevation is compared to a running most positive angle in elevation for the path. A direct view angle in elevation is calculated that would give wireless visibility, in the absence of obstructions, to the access point at the given height above ground level. If the direct view angle in elevation is less than the running most positive angle in elevation for the path, the location is marked as a location at which the subscriber module would not be wirelessly visible to an access point of the given height.

Processing the elevation data and the location data to generate a wireless visibility data file may comprise calculating, for each of a plurality of paths extending radially away from the subscriber module to a respective point on a boundary of an area containing the subscriber module, for successive locations on the respective path, a direct view angle in elevation that would give wireless visibility, in the absence of obstructions, to the access point at the given height above ground level. A respective height allowance may be added for a Fresnel zone to the elevation at each of a plurality of locations between the access point and the subscriber module to determine a modified terrain height for each of the plurality of locations, and it is determined if a ray along the direct view path intercepts the modified terrain height for each of the plurality of locations. Dependent on a determination that a ray along the direct view path intercepts the modified terrain height for at least one of the plurality of locations, the location is marked as a location at which the subscriber module would not be wirelessly visible to an access point of the given height.

Accessing elevation data for the given geographical area may comprise providing a geographical terrain and clutter data file for the given geographical area, and processing the geographical terrain and clutter data file to create an elevation data file having elevation data for each of a plurality of raster tiles.

Processing the geographical terrain data and clutter file to create the elevation data file may comprise processing the geographical terrain and clutter data file to create an intermediary data file having a pixelated raster tile format and having associated geographic data associated with each of a plurality of tiles, and processing the intermediary data file to extract first elevation data as a one-dimensional array representing elevation data of each of the plurality of tiles representing locations within an area of control of the access point.

The method may comprise copying the one-dimensional array from a first computing device to a second computing device, performing the processing of the elevation data on the second computing device, and transferring the output data from the second computing device to the first computing device. A representation of output data may be displayed indicating numbers of visible subscriber modules as a function of location of the access point on the first computing device, as for example shown in FIG. 13.

The geographical terrain and clutter data file may comprise terrain and clutter data and may have has a GeoTIFF format. The intermediary data file may have a Virtual Raster Tile format.

Figure 16:
FIG. 16 illustrates display showing identification of buildings having coverage at specified SM height.
Figure 17:
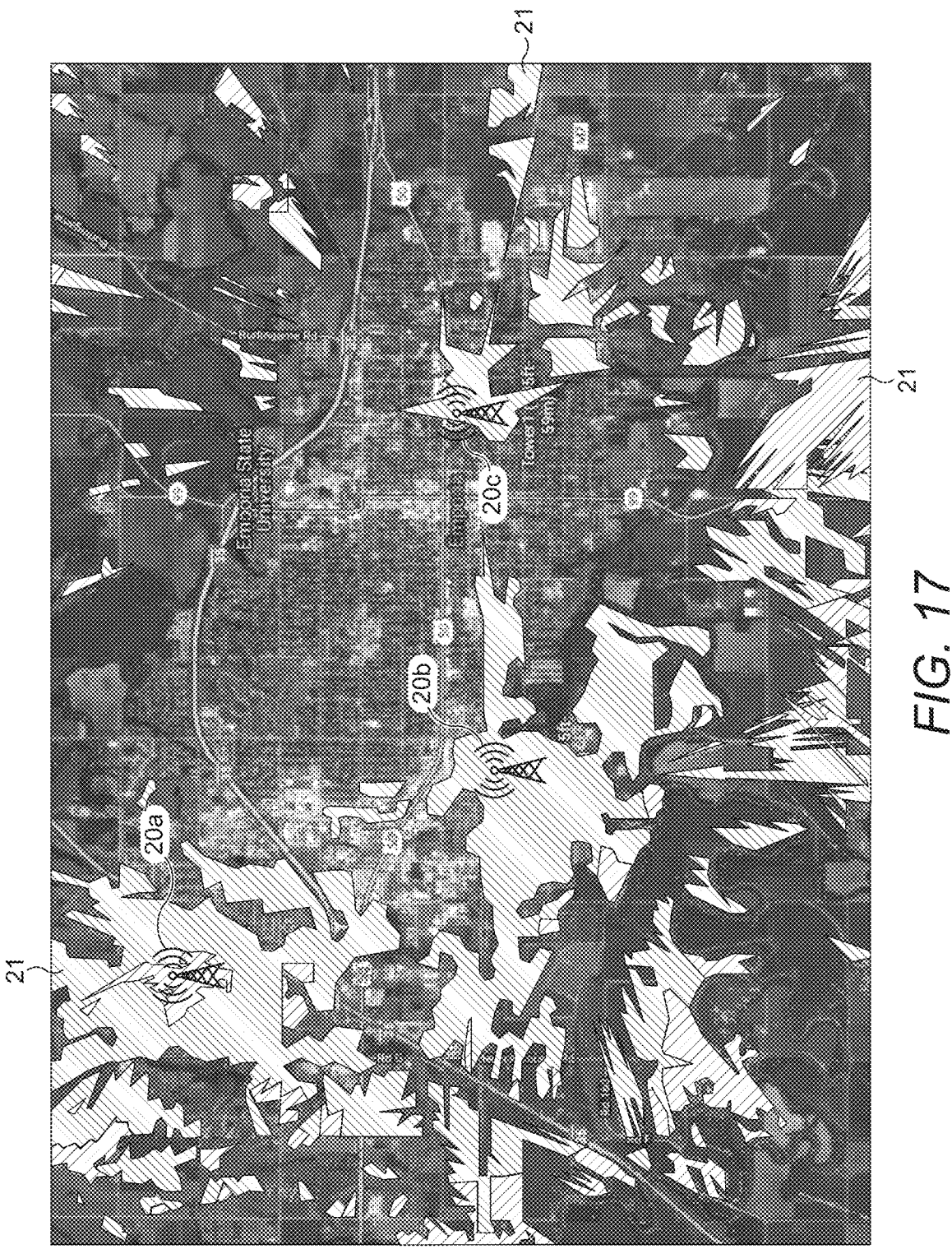
FIG. 17 illustrates a dynamically created map according to user input of access point location.

FIGS. 16 and 17 show examples of the output of a graphical user interface according to the claimed methods. FIG. 16 shows a heat map similar to that of FIGS. 8a, 8b and 15, showing areas of coverage for a required subscriber module height above terrain and clutter, i.e. above buildings. The hashed areas show where a subscriber module of a given height has wireless connectivity, i.e. coverage, from an access point or access points at given locations. The given height of the subscriber module may be entered using the slider. The heat map is shown overlaid on a satellite view of the area. The location of properties requiring wireless coverage is entered as a file in the CPU and compared with the areas of the heat map showing coverage. The display of FIG. 16 indicates properties which have coverage by, in this example, a solid line 18a, 18b and indicates properties which do not have coverage by, in this example, a broken line 19a, 19b. It can be seen from the display which parts of a building may be used to site a subscriber module to give wireless coverage, and at what height the subscriber module is to be installed. The height may be specified as giving coverage at a minimum received signal strength (RSSI) level. An output may be provided giving addresses and latitude and longitude location of buildings having coverage.

FIG. 17 shows a heat map dynamically created by an end user, such as an installer, by moving locations of access points 20a, 20b, 20c. The heat map shows, in this case, hashed areas 21 in which a subscriber module of a given height can obtain coverage from one or more access points. The heat map may be obtained by overlaying heat maps for individual access point locations, obtained by the methods as for FIGS. 8a, 8b and 15. This allows real time site placement as a batch. In an example, an end-user may provide a csv file of sites along with required subscriber module coverage height. Typically, in less than 30 seconds per site, a map showing coverage may be returned form cloud servers. This has the benefit that iterations can be run very quickly by a service provider to optimise access point site placement. Access points may be placed at sites and the required minimum subscriber module height may be displayed for each pixel location of a coverage map. This also allows a quick understanding of the best position and height to install a subscriber module on a customer's property.

Embodiments of the invention will now be described in more detail.

The apparatus according to embodiments of the invention, given a location of an Access Point (AP), a radius, a frequency, an AP height, a max SM height, and terrain data of a relevant area, may aid an end user in the determination of optimal locations for Subscriber Modules (SMs) whilst minimizing costs by creating a map which shows the minimum SM height necessary to make a line of sight to the AP. This can extend to various forms of Radio Line of Sight (near line of sight, propagation through surfaces, etc.) as well as visual line of sight.

Initially, in an example, the program takes an input data file consisting of the terrain and clutter data. This file format is any file which an arbitrary GIS library (e.g. the current prototype uses the Geospatial Data Abstraction Library (GDAL)) may process (e.g. a GeoTIFF). Then, the program converts the terrain data into an intermediary file (the current prototype uses a Virtual Raster Tile (.vrt) file) to act as a universal, internal intermediary. This conversion means that regardless of how the metadata of the original terrain data is structured, it is converted into a consistent, single format. The intermediary data format is a pixelated raster tile with associated metadata for geographic datum, projection, etc.

Next, in an example, the program creates a data structure referred to as the boundingBox, which it does through the function getBoundingBox. getBoundingBox reads the elevation data from the intermediary file and converts it into a one-dimensional array. This one-dimensional array does not necessarily encompass the entirety of the intermediary file. This array only covers the circle of control which spans the area around the AP, corresponding to the size of the input radius for smaller inputs. For larger input the one-dimensional array covers the entirety of the intermediary file. Then, after the program creates the boundingBox, the array is copied onto a high-performance computing unit (e.g. a GPU, also referred to as the device) from the original computing unit (e.g. a CPU also referred to as the host).

Next, in an example, the program creates a viewshed. To begin, a thread is allocated for every pixel on the edge of the bounding box. Every thread is responsible for a single ray starting from the center of the bounding box, which corresponds with the AP, to the border of the bounding box. Not every ray gets to the border of the bounding box; the rays get cut off once they have surpassed the radius (as shown in FIG. 6). The ray casting process occurs by iteratively checking the height of each pixel starting from the AP to the edge of the circle of control. Initially, the x and y components of each ray are calculated only with respect to the top down view of the viewshed, and with each iteration, the ray casting loop, the algorithm increments x and y coordinates of the currently observed pixel by the x and y components of the slope of the ray. At each point, the angle of incidence to the currently observed pixel with the SM height is calculated and compared to the smallest angle seen so far, as shown in FIG. 2. If the angle of incidence is smaller than the smallest angle of incidence observed so far, then the current angle of incidence replaces the minimum angle of incidence. Then, the pixel is marked with the minimum height which would be needed to be visible, if the height is larger than 0. If the minimum height needed to be visible is less than 0, it is set to a lower bound which either the user provides or is provided by the algorithm. This minimum height is found by taking the tangent of the current angle, and subtracting the tangent of the minimum angle, then multiplying the difference by the distance to the currently observed point. This process may happen concurrently between rays.

However, if the user needs minimum height needed for radio line of sight, then a separate function is taken instead of the viewshed function described in the previous paragraph. This function may assign a thread for every pixel inside of the bounding box; this is because the radio line of sight of a location is independent of the line of sight of the surrounding pixels. The process for calculating radio line of sight of a single pixel is similar to the process of the visual line of sight calculation. So, for a single point, every point in between the SM and AP is checked to see if any incursion has been made into the radio line of sight (FIG. 4). This is done by checking the height of the terrain to the height of the visual line of sight with the radius of the Fresnel zone taken out. Then, to find the minimum height necessary for that individual point to visible, the angle of incidence to the ground with the Fresnel zone added is found and compared to the minimum angle of incidence with the Fresnel zone considered seen so far. If the minimum angle of incidence is larger than the angle of incidence, then the current angle of incidence replaces the smallest angle of incidence seen so far.

Then, when the Minimum SM height has been found for every point, then the output buffer is transferred back from the device to the host. Then the program makes an output file (the current prototype makes a GeoTIFF) with the array data (i.e. the SMs per pixel which is the output format.) in the same way the input data was converted from an intermediary representation into an array. All resources are then freed, and the program terminates.

According to another embodiment, given a list of Subscriber Modules (SMs) and terrain data of a relevant area, a system may run a program to determine optimal locations for an Access Point (APs) by creating an output heat map which shows the overlap of locations which have Line of Sight. This algorithm can extend to various forms of Radio Line of Sight (such as non-line of sight viewshed, like knife edge diffraction) as well as visual line of sight. The overlapping viewsheds are found by checking the line of sight from every SM within a certain area, and then overlays them on one another.

Initially, the program may take takes three forms of input data: the terrain and clutter data file, which is in the form of any file which an arbitrary GIS library (e.g. the current prototype uses the Geospatial Data Abstraction Library (GDAL)) may process (e.g. a GeoTIFF), a file with Subscriber Module locations metadata (e.g. a Comma Separated Value (.csv)), and a flag for visual line of sight or radio line of sight. The program then parses the metadata input file for the relevant data associated with a single subscriber module (namely latitude, longitude, AP height, SM height, frequency of radio wave, and radius of viewshed). Then, the program converts the terrain data into an intermediary file (the current prototype uses a Virtual Raster Tile (.vrt) file) to act as a universal, internal intermediary. This conversion means that regardless of how the metadata of the original terrain data is structured, it is converted into a consistent, single format. The intermediary data format is a pixelated raster tile with associated metadata for geographic datum, projection, etc.

Next, the algorithm may create a data structure referred to as the superBox, which it does through the function getSuperBox. getSuperBox reads the elevation data from the intermediary file and converts it into a one-dimensional array. Then, two more arrays are made on a high-performance computing unit (e.g. a GPU): an output buffer used to hold the final heatmap, and a buffer to hold the viewshed information for a single SM as it is being processed.

Next, in this example, a loop makes a viewshed for each, individual SM. A miniature box which is a subset of the buffer for the individual SM is then split into four quadrants. The four quadrants represent the four sides of the portion of the individual SM buffer which maybe be reached by the viewshed. Another version of the current prototype does not split the box; this process is not necessary, just useful. Then, a thread is allocated on a high-performance computing unit for each pixel on the border of the miniature box; for each thread, a single line of sight is traced from the SM to the border of the circle of visibility (FIG. 6). The algorithm makes the circle of visibility (also referred to as the zone of control) by only finding the line of sight for pixels with a distance less than or equal to the original argument radius.

The single ray may be cast in the following manner. A point which represents the center of the miniature box is created, and the x and y component of the slope of the ray which represent the pixels/raster coordinates which the ray will traverse. This point also has a 1-dimensional index associated with it, as all arrays, no matter what their abstract dimensionality, are 1-dimensional on the level of machine code. Then, for every point in the ray which needs to be traversed, the height of that location is taken, and converted into an angle of incidence. If the angle of incidence is smaller than the smallest angle of incidence seen so far, then it replaces the smallest angle of incidence seen so far. The idea is that the smallest angle of incidence corresponds with the largest height, and if the current angle of incidence with then AP's antenna height factored in is smaller than the smallest angle of incidence seen so far, then the SM must be visible from the perspective of the AP. If that specific pixel is visible, then the output buffer for the individual pixel is marked as visible. All pixels in the buffer may be initialized to be not visible. This process may happen concurrently with all rays, as each ray has a single thread associated with it.

Then, when the entire single SM buffer has been processed, every corresponding pixel which was marked as visible in the single SM buffer is incremented in the final output buffer. This process then occurs once again for every SM which was given in the .csv.

After the final output array is created, then the algorithm makes an output file (the current prototype makes a GeoTIFF) with the array data (i.e. the SMs per pixel which is the output format.) in the same way the input data was converted from an intermediary representation into an array. Then, all resources are freed, and the program terminates.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What we claim is:

1. A method of operating a system comprising a first computing device and a second computing device to determine a respective preferred installation height above ground level for each of a plurality of locations for a subscriber module for receiving a radio link from an access point in a wireless network, the access point having a given height above ground level and a specified location, and the subscriber module being situated within a given geographical area including the location of the access point, the method comprising:
  accessing, at the first computing device, an elevation data file for the given geographical area;
  sending the elevation data file from the first computing device to the second computing device;
  processing, at the second computing device, the elevation data file to generate a preferred height data file representing a preferred height for a subscriber module to be wirelessly visible by the access point at each of the plurality of locations;
  sending the preferred height data file from the second computing device to the first computing device; and processing, at the first computing device, the preferred height data file to provide output data indicating the preferred height of the subscriber module as a function of location and displaying an indication of the preferred height of the subscriber module as a function of location at the first computing device.

2. The method of claim 1, wherein said processing the elevation data file to generate a preferred height data file is by an iterative process comprising:
calculating, for each of a plurality of paths extending radially away from the access point to a respective point on a boundary of an area containing the access point, an angle of inclination from the horizontal for a ray between the access point and a plurality of successive locations on each respective path away from the access point;
for each successive location on the respective path, comparing the current angle of inclination to a running minimum angle of inclination for the path; and
dependent on the current angle of inclination being greater than the running minimum angle of inclination for the path, calculating the preferred height of the subscriber module as at least the height that would result in wireless visibility between the access point and the subscriber module.

3. The method of claim 2, wherein calculating the preferred height of the subscriber module as at least the height that would result in wireless visibility between the access point and the subscriber module comprises:
calculating the preferred height of the subscriber module as at least the height that would result in an angle of inclination equal to the running minimum angle of inclination for the path.

4. The method of claim 2, wherein calculating the preferred height of the subscriber module as at least the height that would result in wireless visibility between the access point and the subscriber module comprises:
adding a respective height allowance for a Fresnel zone to the elevation at each of a plurality of locations between the access point and the subscriber module to determine a modified terrain height for each of the plurality of locations; and
calculating the preferred height of the subscriber module such that a line of sight between the subscriber module and the access point clears the modified terrain height for each of the plurality of locations.

5. The method of claim 1 wherein said accessing elevation data for the given geographical area comprises:
providing a geographical terrain data file for the given geographical area; and
processing the geographical terrain data file to create an elevation data file having elevation data for each of a plurality of raster tiles.

6. The method of claim 5, wherein processing the geographical terrain data file to create the elevation data file comprises:
processing the geographical terrain data file to create an intermediary data file having a pixelated raster tile format and having associated geographic data associated with each of a plurality of tiles; and
processing the intermediary data file to extract first elevation data as a one-dimensional array representing elevation data of each of the plurality of tiles representing locations within an area of control of the access point.

7. The method of claim 6, comprising:
copying said one-dimensional array from a first computing device to a second computing device;
performing said processing of the elevation data on the second computing device;
transferring said output data from the second computing device to the first computing device; and
displaying a representation of output data indicating the preferred height of the subscriber unit as a function of location on the first computing device.

8. The method of claim 6, wherein the intermediary data file has a Virtual Raster Tile format.

9. The method of claim 5, wherein the geographical terrain data file comprises terrain and clutter data and has a GeoTIFF format.

10. The method of claim 1, wherein said processing the required height data file comprises:
receiving an input indicating a maximum subscriber height; and
processing the required height data file to create a data file indicating locations at which a subscriber module is wirelessly visible by the access point.

11. A system comprising a first computing device and a second computing device for determining a respective preferred installation height above ground level for each of a plurality of locations for a subscriber module for receiving a radio link from an access point in a wireless network, the access point having a given height above ground level and a specified location, and the subscriber module being situated within a given geographical area including the location of the access point, wherein the first computing device is configured to perform a process comprising:
accessing elevation data for the given geographical area; and
sending the elevation data file from the first computing device to the second computing device;
wherein the second computing device is configured to perform a process comprising:
processing the elevation data file to generate a preferred height data file representing a preferred height for a subscriber module to be wirelessly visible by the access point at each of the plurality of locations; and
sending the preferred height data file from the second computing device to the first computing device; and
wherein the first computing device is further configured to perform a process comprising:
processing the preferred height data file to provide output data indicating the preferred height of the subscriber module as a function of location and displaying an indication of the preferred height of the subscriber module as a function of location.

12. The system of claim 11, wherein said accessing elevation data for the given geographical area comprises:
providing a geographical terrain data file for the given geographical area; and
processing the geographical terrain data file to create an elevation data file having elevation data for each of a plurality of raster tiles,
wherein processing the geographical terrain data file to create the elevation data file comprises:
processing the geographical terrain data file to create an intermediary data file having a pixelated raster tile format and having associated geographic data associated with each of a plurality of tiles; and
processing the intermediary data file to extract first elevation data as a one-dimensional array representing elevation data of each of the plurality of tiles representing locations within an area of control of the access point.

13. The system of claim 12, wherein the first computing device and the second computing device are configured to:
copy said one-dimensional array from the first computing device to the second computing device;
perform said processing of the elevation data on the second computing device;
transfer said output data from the second computing device to the first computing device; and
display a representation of output data indicating the preferred height of the subscriber unit as a function of location on the first computing device.

14. The system of claim 11,
comprising a graphical user interface for receiving an input indicating a maximum subscriber height in the form of a moveable slider; and
wherein said processing the required height data file comprises:
processing the required height data file to create a data file indicating locations at which a subscriber module is wirelessly visible by the access point.

15. A method of operating a system comprising a first computing device and a second computing device to determine preferred locations for an access point for receiving a radio link from a plurality of subscriber modules in a wireless network, the subscriber modules and the access point being situated within a given geographical area, the method comprising using the first computing device to:
access elevation data for the given geographical area;
access location and height data for each subscriber module; and
send the elevation data and the location and height data to the second computing device;
using second computing device to:
for each subscriber module, process at least the elevation data and the location and height data to generate a wireless visibility data file indicating the wireless visibility of the subscriber module by an access point having a given height above ground level at each of a plurality of locations; and
send the wireless visibility data file to the first computing device; and
using the first computing device to process the wireless visibility data file to provide output data indicating numbers of wirelessly visible subscriber modules as a function of location of the access point.

16. The method of claim 15, wherein said processing the elevation data and the location data to generate a wireless visibility data file is by an iterative process comprising:
calculating, for each of a plurality of paths extending radially away from the subscriber module to a respective point on a boundary of an area containing the subscriber module, an angle in elevation for a ray between the subscriber module and a plurality of successive locations on each respective path away from the subscriber module;
for successive locations on the respective path, comparing the current angle in elevation to a running most positive angle in elevation for the path; and
calculating a direct view angle in elevation that would give wireless visibility, in the absence of obstructions, to the access point at the given height above ground level, and if the direct view angle in elevation is less than the running most positive angle in elevation for the path, marking the location as a location at which the subscriber module would not be wirelessly visible to an access point of the given height.

17. The method of claim 15, wherein said processing the elevation data and the location data to generate a wireless visibility data file comprises:
calculating, for each of a plurality of paths extending radially away from the subscriber module to a respective point on a boundary of an area containing the subscriber module, for successive locations on the respective path, a direct view angle in elevation that would give wireless visibility, in the absence of obstructions, to the access point at the given height above ground level;
adding a respective height allowance for a Fresnel zone to the elevation at each of a plurality of locations between the access point and the subscriber module to determine a modified terrain height for each of the plurality of locations;
determining if a ray along the direct view path intercepts the modified terrain height for each of the plurality of locations; and
dependent on a determination that a ray along the direct view path intercepts the modified terrain height for at least one of the plurality of locations, marking the location as a location at which the subscriber module would not be wirelessly visible to an access point of the given height.

18. The method of claim 15 wherein said accessing elevation data for the given geographical area comprises:
providing a geographical terrain and clutter data file for the given geographical area; and
processing the geographical terrain and clutter data file to create an elevation data file having elevation data for each of a plurality of raster tiles.

19. The method of claim 18, wherein processing the geographical terrain data and clutter file to create the elevation data file comprises:
processing the geographical terrain and clutter data file to create an intermediary data file having a pixelated raster tile format and having associated geographic data associated with each of a plurality of tiles; and
processing the intermediary data file to extract first elevation data as a one-dimensional array representing elevation data of each of the plurality of tiles representing locations within an area of control of the access point.

20. The method of claim 19, comprising:
copying said one-dimensional array from a first computing device to a second computing device;
performing said processing of the elevation data on the second computing device;
transferring said output data from the second computing device to the first computing device; and
displaying a representation of output data indicating numbers of visible subscriber modules as a function of location of the access point on the first computing device.

* * * * *